United States Patent
Marupaduga

(10) Patent No.: US 10,070,456 B1
(45) Date of Patent: Sep. 4, 2018

(54) SELECTION OF RESOURCE SCHEDULING MODE IN AN OFDMA BASE STATION

(71) Applicant: Sprint Communications Company L.P., Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 908 days.

(21) Appl. No.: 14/065,561

(22) Filed: Oct. 29, 2013

(51) Int. Cl.
*H04W 72/12* (2009.01)

(52) U.S. Cl.
CPC .............................. *H04W 72/1263* (2013.01)

(58) Field of Classification Search
None
See application file for complete search history.

(56) References Cited

U.S. PATENT DOCUMENTS

| | | | |
|---|---|---|---|
| 2008/0187063 A1* | 8/2008 | Yu | H04B 1/7143 375/260 |
| 2010/0034152 A1* | 2/2010 | Imamura | H04L 5/0007 370/329 |
| 2011/0256896 A1* | 10/2011 | Giaretta | H04W 4/00 455/509 |
| 2012/0287885 A1 | 11/2012 | Dai | |
| 2012/0327896 A1 | 12/2012 | Lee et al. | |
| 2014/0269336 A1* | 9/2014 | Lee | H04L 5/0007 370/241 |

FOREIGN PATENT DOCUMENTS

| | | |
|---|---|---|
| EP | 2484099 | 4/2011 |
| WO | 2011041459 | 4/2011 |

* cited by examiner

*Primary Examiner* — Yemane Mesfin
*Assistant Examiner* — Jeff Banthrongsack

(57) ABSTRACT

A base station schedules OFDMA resource blocks for M2M communication devices. The base station exchanges wireless communications with wireless user equipment. From the wireless user equipment, the base station receives transmission error data characterizing the wireless communications transferred from the wireless user equipment. Based on the wireless transmission error data, the base station selects an orthogonal mode or a shared mode for M2M communications. If orthogonal mode is selected, the base station schedules contiguous resource blocks for the M2M devices, so the resource blocks use contiguous frequencies and contiguous timeslots that are not shared with the wireless user equipment. If shared mode is selected, the base station schedules non-contiguous resource blocks for the M2M devices, so the non-contiguous resource blocks use non-contiguous frequencies and non-contiguous timeslots that are shared with the wireless user equipment. The base station receives M2M communications transferred by the M2M devices based on the selected schedule.

18 Claims, 7 Drawing Sheets

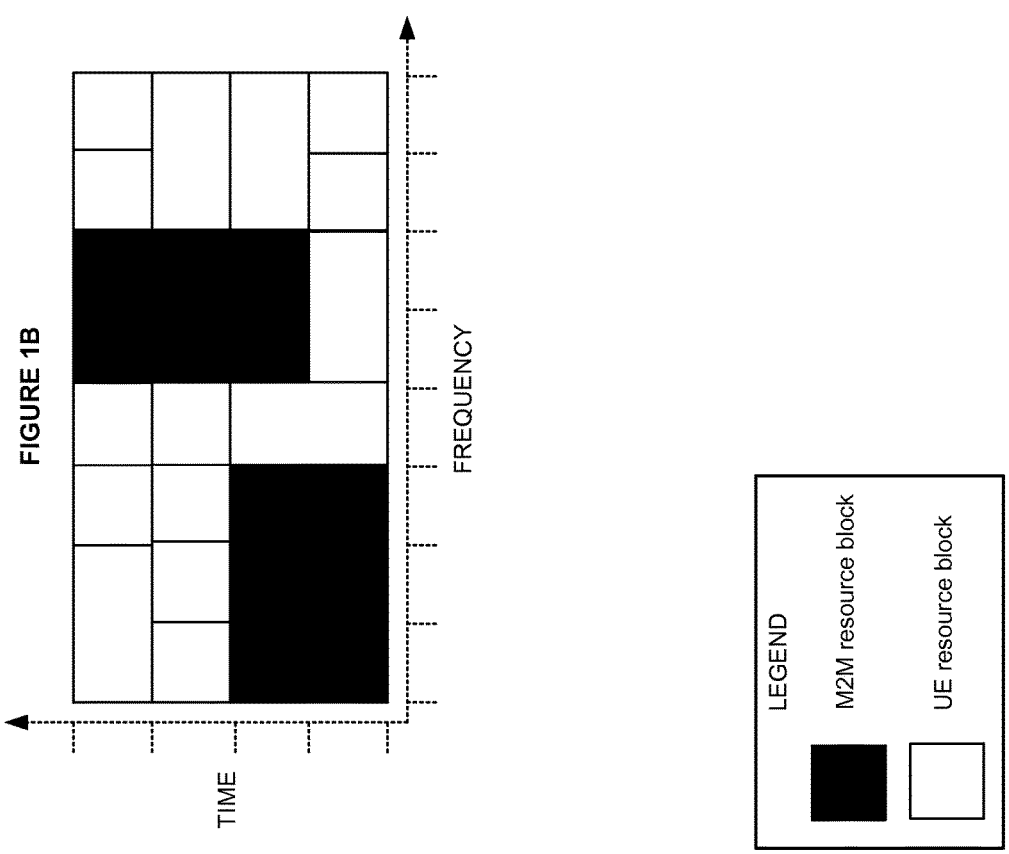

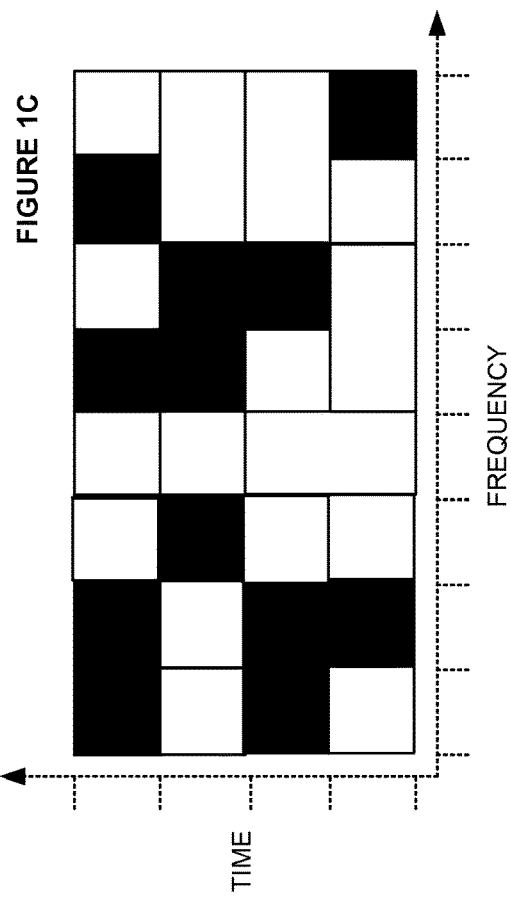
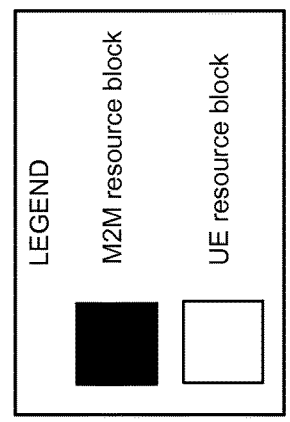

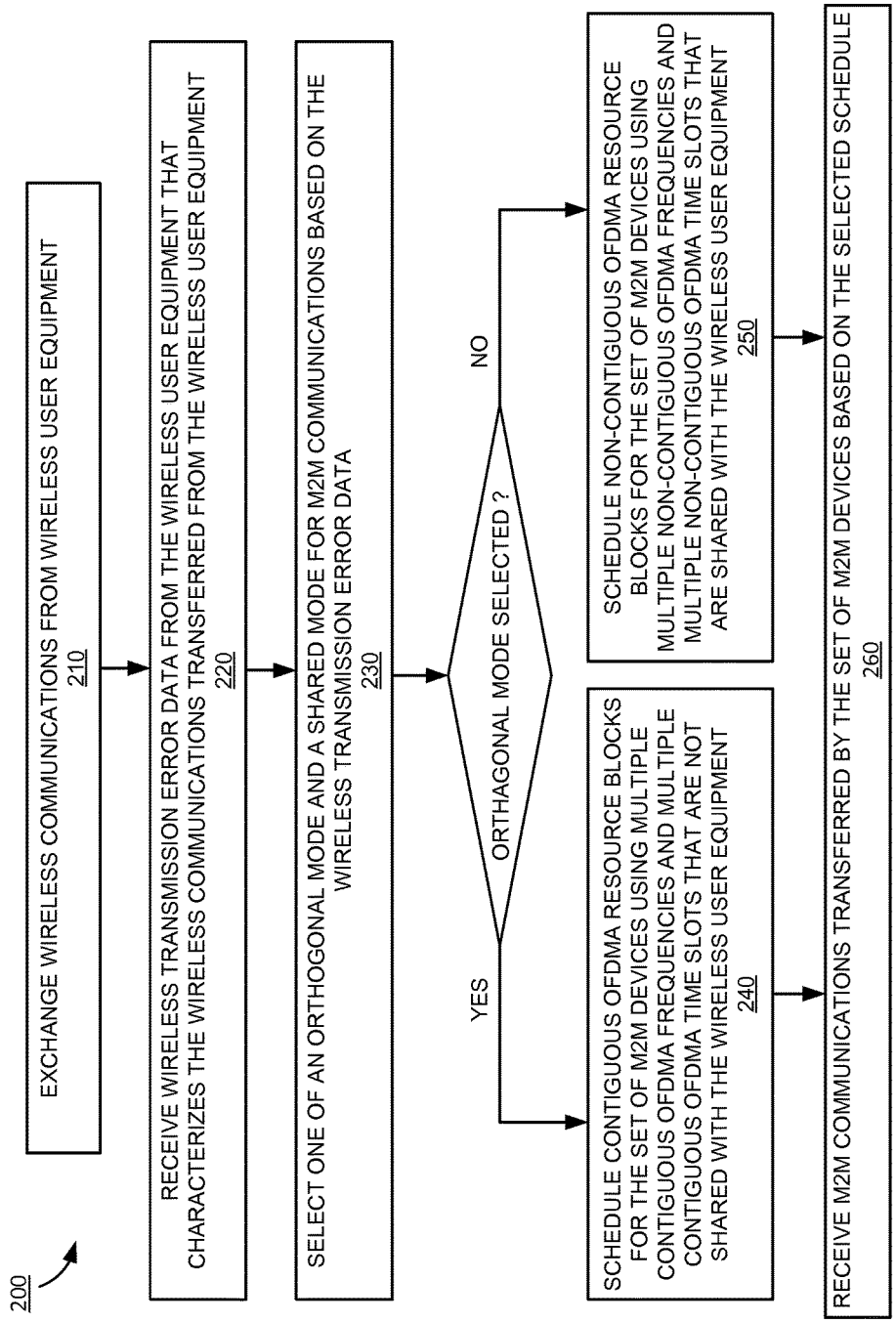

SELECTION OF RESOURCE SCHEDULING MODE IN AN OFDMA BASE STATION

TECHNICAL BACKGROUND

Orthogonal frequency-division multiple access (OFDMA) is a radio modulation scheme for wireless networking. Like its predecessor, orthogonal frequency-division multiplexing (OFDM), OFDMA slices a channel's bandwidth into subcarrier frequencies over which portions of a data stream may be carried in parallel. Since the subcarriers are independent transmission streams, their throughput may independently vary. This allows OFDMA to more rapidly modulate the higher quality subcarriers and degrade gracefully when some subcarriers succumb to excessive noise or fade. OFDMA improves upon OFDM by letting different users simultaneously transmit on separate subcarriers. The spatially variable nature of noise and fade means that the observations by different users will not agree as to which subcarriers are higher quality. When these observations are conveyed to an OFDMA base station, the base station may better match frequencies with users, thereby achieving diversity gain.

An OFDMA resource scheduler, typically implemented within a base station, multiplexes users across time and frequency. The resource scheduler accomplishes media access control by assigning to users portions of time-frequency known as resource blocks. If a user is assigned too many resource blocks for a given time, the user's peak power will be too high, which is a problem that affected OFDMA's predecessor, OFDM. If a user is assigned too few resource blocks at a time, the user's transmission will take longer and possibly jeopardize quality of service or cause an application timeout. If a resource scheduler divides the frequencies amongst too many simultaneous users or grants a user multiple frequencies that are not contiguous, interference may arise between subcarriers.

Although OFDMA schedulers are maturing, a new class of OFDMA terminal is emerging in a potentially disruptive way. These are the machine-to-machine (M2M) devices deployed out in the wild and programmed to routinely make contact with back-office servers and without human interaction. Examples of M2M devices include vending machines, security alarms, vehicle fleets, utility meters, and digital billboards. The applications and form factors of M2M devices are diverse, but their machine type communications (MTC) have consistent characteristics. In this sense M2M devices are akin to remote sensors. They tend to transmit more than receive. The transmissions are small and periodic. M2M devices have high tolerance for delays and expect little quality of service. Masses of M2M devices may be deployed by one owner who must be more price sensitive than an owner of an individual user equipment such as a smart phone. Due to these factors, the characteristics of M2M transmissions are typically the opposite of communications by human users. An OFDMA resource scheduler that treats user communications and M2M communications as being identical will likely not achieve an optimal assignment of resources and risks degrading the quality of service of more important or more profitable communications.

TECHNICAL OVERVIEW

An OFDMA base station system schedules OFDMA resource blocks for a set of M2M communication devices. The base station exchanges wireless communications with wireless user equipment. From the wireless user equipment, the base station receives wireless transmission error data that characterizes the wireless communications transferred from the wireless user equipment. Based on the wireless transmission error data, the base station's control system selects either an orthogonal mode or a shared mode for M2M communications. If the orthogonal mode is selected, the base station schedules contiguous OFDMA resource blocks for the M2M devices, such that the resource blocks use contiguous frequencies and contiguous time slots that are not shared with the wireless user equipment. If the shared mode is selected, the base station schedules non-contiguous OFDMA resource blocks for the M2M devices, such that the non-contiguous resource blocks use non-contiguous frequencies and non-contiguous time slots that are shared with the wireless user equipment. The base station receives M2M communications transferred by the M2M devices based on the selected schedule.

BRIEF DESCRIPTION OF THE DRAWINGS

FIG. 1B illustrates the allocation of OFDMA resources to M2M devices according to orthogonal mode.

FIG. 1C illustrates the allocation of OFDMA resources to M2M devices according to shared mode.

FIG. 2 illustrates the behavior of a wireless communication system that schedules OFDMA resources for M2M devices.

DETAILED DESCRIPTION

Figure 1A:
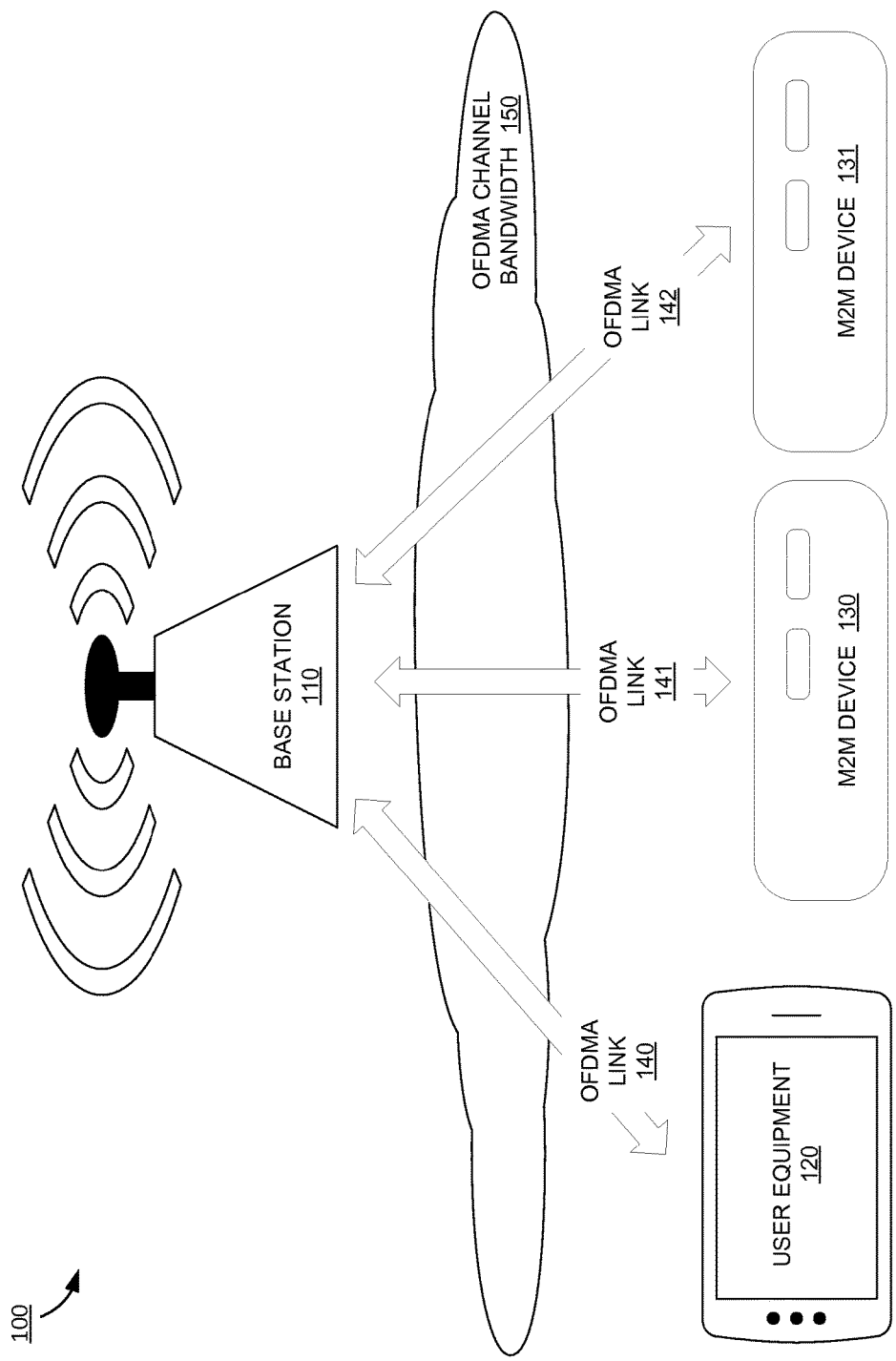
FIG. 1A illustrates a wireless communication system that schedules OFDMA resources for M2M devices.

FIG. 1A illustrates wireless communication system 100 that selects an OFDMA resource scheduling mode. Base station 110 may be an LTE eNodeB, a WiMax base station, a mobile broadband wireless access (MBWA) base station, a Flash-OFDM base station, an ultra mobile broadband (UMB) base station, or some other wireless OFDMA access point that schedules resources. Base station 110 provides wireless network access to a variety of wireless communication devices, including user equipment 120 and M2M devices 130-131. User equipment 120 may be a smart phone, a tablet, a personal computer, a game console, a hand-held or wearable console, or other software processing device that has a wireless transceiver. M2M devices 130-131 may be any processing device of any purpose that wirelessly communicates independent of any human operation, such as a vending machine, a security alarm, a vehicle fleet, a utility meter, or a digital billboard. User equipment 120 and M2M devices 130-131 connect to base station 110 over OFDMA links 140-142 respectively. The bandwidth of any of OFDMA links 140-142 is not constant. Instead base station 110 has OFDMA channel bandwidth 150 that is shared between OFDMA links 140-142 according to resource allocations made dynamically by an OFDMA scheduler within base station 110.

While exchanging wireless communications with base station 110, user equipment 120 gathers transmission error data that characterizes the communications that user equipment 120 transfers. Transmission error data may include metrics such as a bit error rate, a block error rate, or any other metric indicative of a degraded radio link. Base station 110 uses the transmission error data that it receives from user equipment 120 as threshold criteria for selecting amongst scheduling modes.

Base station 110 has at least two scheduling modes, each of which is better suited for a particular set of operating conditions on OFDMA channel bandwidth 150. Base station 110 dynamically selects a scheduling mode according to how much stress OFDMA channel bandwidth 150 experiences, such as traffic congestion and environmental radio noise pollution. When determining how stressed is OFDMA channel bandwidth 150, base station 110 relies at least partly on transmission error data sent by user equipment 120.

When OFDMA channel bandwidth 150 experiences light or moderate traffic without much environmental radio noise pollution, base station 110 has the freedom to arrange the allocation of M2M resource blocks in a special way that increases spectral efficiency by leveraging the low throughput and high delay tolerance typical of M2M communications. Under these spectral conditions base station 110 selects the orthogonal scheduling mode, which segregates M2M traffic from UE traffic. Orthogonal scheduling achieves this segregation by arranging M2M resource block allocations into groups of resource blocks that are contiguous in time and frequency. The coarse-grained allocation of M2M resource blocks achieved by orthogonal scheduling is illustrated in FIG. 1B. This clustering of M2M resource blocks reduces the peak power of an M2M transmission and reduces interference between simultaneous transmissions. The ultimate result is increased spectral efficiency.

Orthogonal scheduling allocates contiguous resources for M2M communications but not for user equipment communications. This limitation may make orthogonal scheduling unsuitable at times. Stressful operating conditions on OFDMA channel bandwidth 150 may cause user equipment communications to compete for resources as the orthogonal scheduler continues to allocate contiguous resources for M2M communications and the remaining healthy subchannels become fewer. Under orthogonal scheduling, user equipment 120's OFDA link 140 may become resource constrained. When this occurs user equipment 120 may experience too many transmission errors. This may be unacceptable since some user equipment communications typically need a higher quality of service and generate more revenue than M2M communications.

In order to restore fairness of resource allocations for user equipment communications, when base station 110 receives from user equipment 120 wireless transmission error data indicating too many transmission errors, base station 110 selects shared scheduling mode. Shared scheduling mode makes no effort to arrange M2M resources contiguously and instead makes allocations perhaps as small as a single resource block. Smaller allocations allow the scheduler to be more opportunistic in how it comingles and interleaves transmissions. The fine-grained allocation of M2M resource blocks achieved by shared scheduling is illustrated in FIG. 1C. Fine grained allocation allows more transmissions to be multiplexed in both time and frequency. This increased flexibility of allocation enables shared scheduling to achieve fair allocation even when OFDMA channel bandwidth 150 is degraded. The ultimate result is higher quality of service for user equipment communications.

The states and operations involved with selection of resource scheduling mode in wireless communication system 100 are illustrated as behaviors 200 in FIG. 2. Base station 110 and user equipment 120 exchange (210) wireless communications. From user equipment 120 base station 110 receives (220) wireless transmission error data that characterizes the wireless communications transferred from user equipment 120. The base station control system selects (230) one of an orthogonal mode and a shared mode for M2M communications based on the wireless transmission error data. If the orthogonal mode is selected, the base station control system schedules (240) for M2M devices 130-131 contiguous OFDMA resource blocks using multiple contiguous OFDMA frequencies and multiple contiguous OFDMA time slots that are not shared with user equipment 120. If the shared mode is selected, the base station control system schedules (250) for M2M devices 130-131 non-contiguous OFDMA resource blocks for using multiple non-contiguous OFDMA frequencies and multiple non-contiguous OFDMA time slots that are shared with user equipment 120. Based on the selected schedule M2M devices 130-131 transfer (260) communications that base station 110 receives.

Although FIG. 1 illustrates one network topology for wireless communication system 100, other topologies are possible. M2M devices 130-131 typically need little aggregate throughput, even if the set of M2M devices served by base station 110 grows to include many M2M devices. However an excess of M2M devices connected to base station 110 may present other issues such as per-device pricing by the OFDMA service provider or the placement of an M2M device within a shadow having poor OFDMA reception. These issues can be mitigated by inserting an M2M gateway between base station 110 and the M2M devices. In some configurations an M2M gateway only uses OFDMA channel bandwidth 150 as a backhaul connection between the M2M gateway and base station 110. In such a configuration the M2M gateway may connect to M2M devices over a separate air interface such as OFDMA on a different channel bandwidth or Wi-Fi. Using dual air interfaces for backhaul and M2M devices respectively can reduce service provider fees, extend coverage, and offload communication between M2M devices without burdening OFDMA channel bandwidth 150. An M2M gateway having dual air interfaces can be seamlessly added to communication system 100 without needing any alteration of behaviors 200 of FIG. 2.

When the operating conditions of OFDMA channel bandwidth 150 change unexpectedly, base station 110 adapts by selecting a more suitable scheduling mode. To monitor and assess the operating conditions of OFDMA channel bandwidth 150, base station 110 relies at least partly on wireless transmission error data regarding OFDMA link 140 that is sent by user equipment 120. User equipment 120 is an important source of error data because it accurately reflects the quality of service that users experience. When designing wireless communication system 100, the types of error data sent by user equipment 120 should be chosen to convey information that base station 110 might not gather on its own. The error data likely includes simple metrics such as error rates. User device 120 has flexibility as to the granularity of reportable error rates. For example the OFDMA subsystem of user equipment 120 may report a block error rate or a frame error rate. Alternatively a higher level subsystem of user equipment 120 may report the rate of lost IP packets.

Observation of some error rates may involve direct access to the hybrid automatic repeat request (HARQ) implementation of user equipment 120. For example user equipment 120 may observe and report the rate of bit errors that are corrected by the forward error correction of HARQ. Since HARQ retry requests usually occur when OFDMA channel bandwidth 150 is stressed, user equipment 120 may repeatedly send retry requests that are lost until eventually sending one that is successfully received by base station 110. User equipment 120 may report a count of these repeated retry requests.

Observation of some error rates may be possible only when user equipment 120 operates in a special state. Before user equipment 120 may transmit anything, it may need to first connect with base station 110 according to a contention-based random access procedure. User equipment accomplishes this by sending a random access preamble on the random access channel and waiting for a reply from base station 110. When OFDMA channel bandwidth 150 is stressed, the sent preamble may be garbled by noise. When base station 110's cell is crowded with many parties attempting random access simultaneously, contention is likely and preambles sent from different parties may collide. As such user equipment 120 may repeatedly send a random access preamble before eventually receiving a reply from base station 110. User equipment 120 may report a count of these repeated preamble transmissions.

Not all wireless transmission error data sent by user equipment 120 need be raw error counts. For example user equipment 120 typically reports received noise as a channel quality indicator (CQI), either for a particular subband or the entire wideband. User equipment 120 may send this data either as a periodic CQI report on the uplink control channel or as an aperiodic CQI report on the uplink shared channel.

Some of the wireless transmission error data received by base station 110 may be very high level in nature and may involve extraordinary computation by user equipment 120. Depending on the importance of the application this added cost may be justified, especially for high revenue applications such as voice calls. There are many ways user equipment 120 may measure voice quality. The most common metric of call quality is mean opinion score (MOS), which attempts to approximate a user's perception of voice fidelity. Although there are several industry-standard MOS algorithms, the only algorithms that are suitable for use on user equipment 120 are those that do not involve comparing the received voice with the original voice. The more sophisticated MOS algorithms account for delays and echoes when scoring. MOS typically reports a score from 1 to 5, but the rating can be further simplified as a Boolean that flags whether or not toll quality (score exceeds 3) is achieved. MOS is a high level speech metric, but there are other speech metrics that are low level and need less sophistication. Examples include R factor and speech power. Because of the digital nature of audio over OFDMA, many traditional speech metrics apply only to analog transmissions and so may be inappropriate.

Although orthogonal scheduling is concerned with segregating and shaping the M2M traffic, this should be done in ways that do not impact communications with user equipment 120. Since spectral quality requirements of M2M communications tend to be relaxed, base station 110 may favor user equipment 120 when assigning the stronger frequencies, which assumes that the subchannel frequencies can be rated and compared. One way to assess the quality of a frequency is to measure its fading, which is power transmitted but not received. To illustrate fading as an allocation criteria, FIG. 3 has two graphs. The top graph shows decibels received along the channel bandwidth by a user equipment and reported back to a base station. The base station may want to assign the weakest frequencies, as received by user equipment and sent as wireless transmission error data, for M2M communications. For example the top graph shows most faded frequency 300 as the deepest trough in the top graph. During orthogonal scheduling a base station may want to protect user equipment bandwidth by aligning the contiguous M2M frequencies to include most faded frequency 300, as shown in the bottom graph with M2M transmissions 310.

Figure 3:
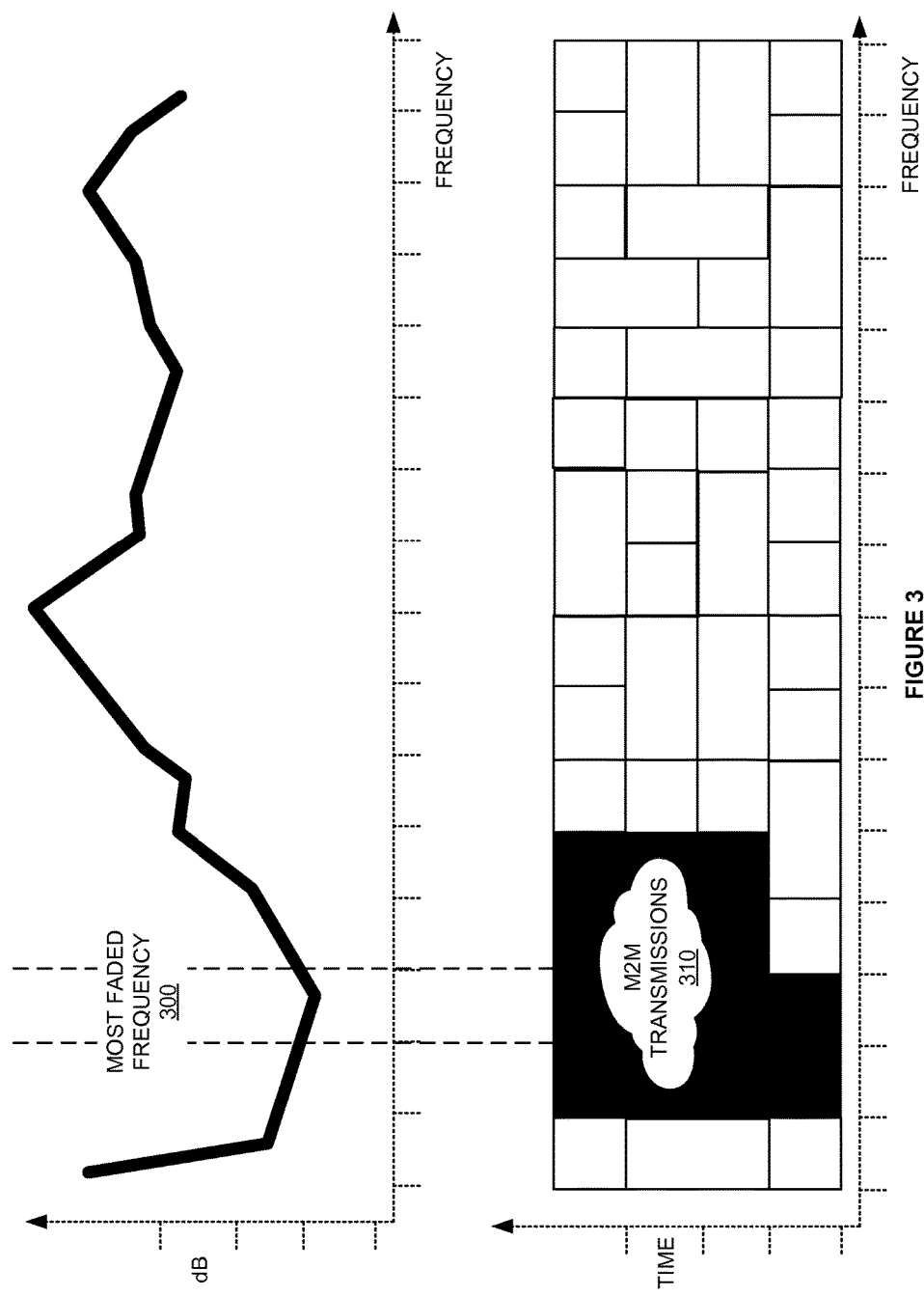
FIG. 3 illustrates the allocation of OFDMA resources to M2M devices according to orthogonal mode.
Figure 4:
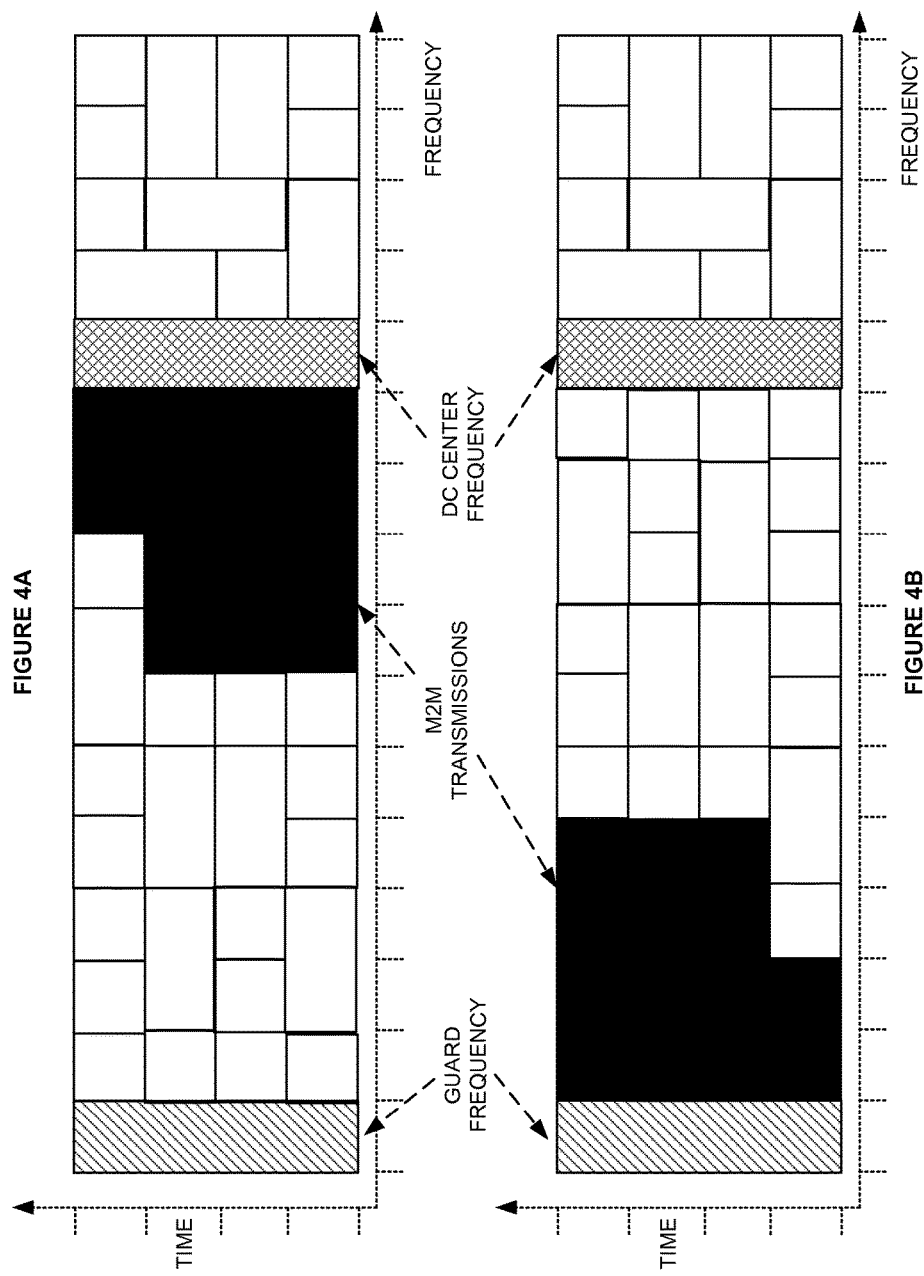
FIG. 4A illustrates the allocation of OFDMA resources to M2M devices according to orthogonal mode.
FIG. 4B illustrates the allocation of OFDMA resources to M2M devices according to orthogonal mode.

The alignment illustrated in FIG. 3 can be adjusted dynamically since which frequency is most faded likely varies over time. Simple heuristics may allow for a more static segregation of bandwidth between user equipment communications and M2M communications. According to wireless transmission error data sent from user equipment, a base station may notice within the channel bandwidth a general region of contiguous frequencies that are usually more faded than the rest of the channel bandwidth. A simple heuristic may regard the faded region as being on either outside edge of the channel bandwidth or in the middle of the channel bandwidth. FIGS. 4A and 4B illustrate such heuristics. If the middle of the channel bandwidth is weak, M2M transmissions may be assigned frequencies that abut the DC center frequency that serves as a standard reference subcarrier in OFDMA, as illustrated by FIG. 4A. A more likely scenario is that an outside edge of the channel bandwidth is weak. In that case M2M transmissions may be assigned frequencies that abut the guard frequency that is standard to OFDMA and lies on the extreme edge of either side of the channel bandwidth, as illustrated in FIG. 4B.

Figure 5:
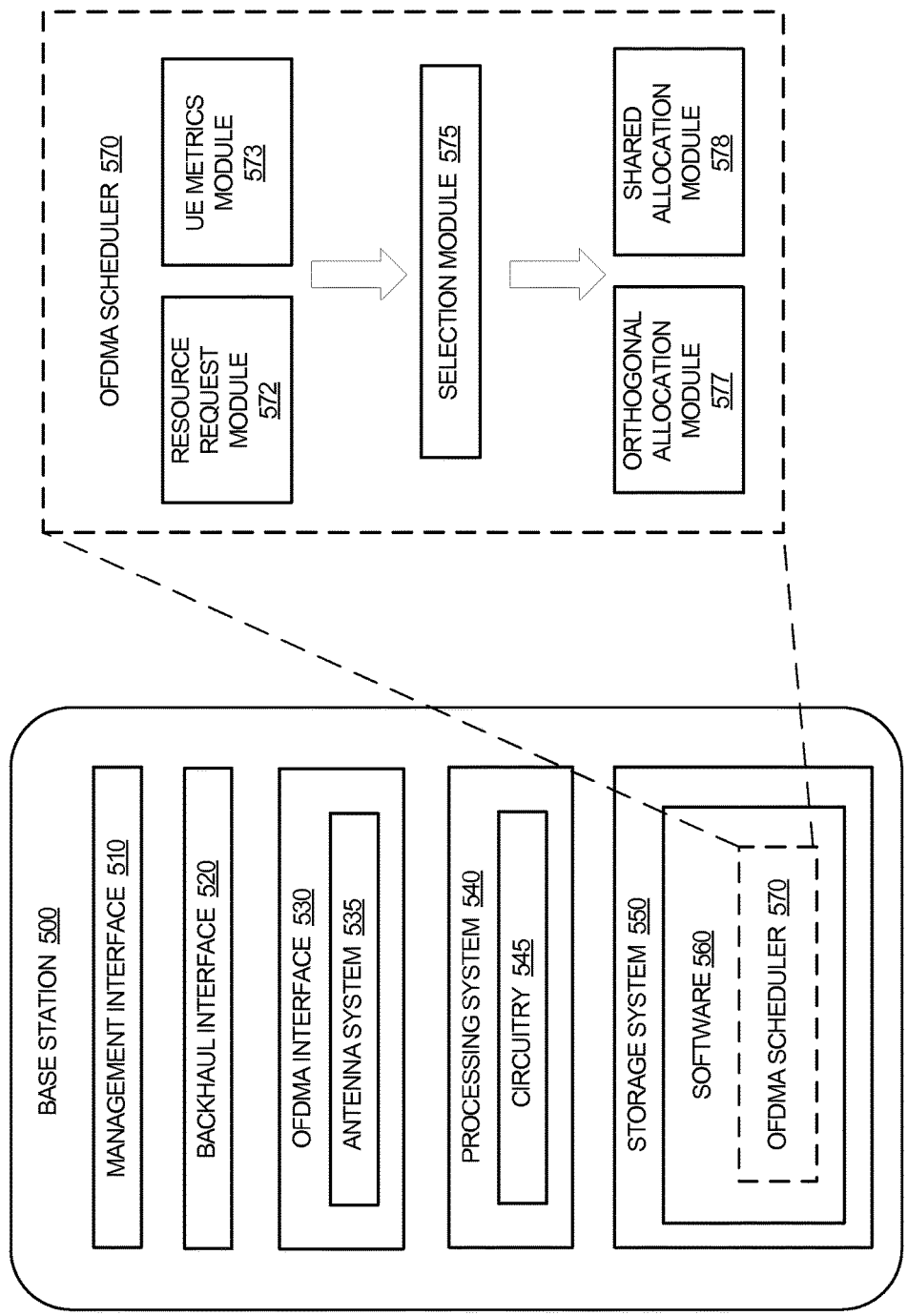
FIG. 5 illustrates a base station that schedules OFDMA resources for M2M devices.

FIG. 5 illustrates base station 500, which is an example internal configuration of base station 110, although base station 110 could use alternative configurations. Base station 500 comprises management interface 510, backhaul interface 520, OFDMA interface 530, and processing system 540. Processing system 540 is linked to management interface 510, backhaul interface 520, and OFDMA interface 530. Processing system 540 includes processing circuitry 545 which is connected to storage system 550 that stores operating software 560. Base station 500 may include other well-known components such as a power supply and enclosure that are not shown for clarity. Base station 500 may be an LTE eNodeB, a WiMax base station, a mobile broadband wireless access (MBWA) base station, a Flash-OFDM base station, an ultra mobile broadband (UMB) base station, or some other wireless OFDMA access point.

OFDMA interface 530 comprises RF communication circuitry and antenna system 535. The RF communication circuitry typically includes an amplifier, filter, RF modulator, and signal processing circuitry. OFDMA interface 530 may also include a memory device, software, processing circuitry, or some other communication device. Base station 500 connects to wireless service provider infrastructure via a backhaul link which may by wireless or cabled. Base station 500 communicates over the backhaul link through backhaul interface 520. Backhaul interface 520 has communication circuitry such as an amplifier, filter, signal modulator, and signal processing circuitry that is appropriate to the transmission medium that carries the backhaul link. Provisioning and supervisory functions, including remote control, are handled by management interface 510.

Processing circuitry 545 comprises microprocessor and other circuitry that retrieves and executes operating software 560 from storage system 550. Storage system 550 comprises a non-transitory storage medium, such as a disk drive, flash drive, data storage circuitry, or some other memory apparatus. Processing circuitry 545 is typically mounted on a circuit board that may also hold storage system 550 and portions of management interface 510, backhaul interface 520, and OFDMA interface 530. Operating software 560 comprises computer programs, firmware, or some other form of machine-readable processing instructions. Operating software 560 includes OFDMA scheduler 570, which is an implementation of the states and operations illustrated in FIG. 2 tailored according to desired features. Operating software 560 may also include an operating system, utilities, drivers, network interfaces, applications, or some other type of software. When executed by processing circuitry 545, operating software 560 directs processing system 540 to operate base station 500 as described herein and in accordance with OFDMA scheduler 570.

The implementation of OFDMA scheduler 570 may be an aggregation of modules such as those shown in FIG. 5. Resource request module 572 accepts scheduling requests from M2M devices and user equipment. UE metrics module 573 collects wireless transmission error data from user equipment. Both resource request module 572 and UE metrics module 573 inform selection module 575 of changes in demand or channel bandwidth quality. Selection module 575 evaluates the information it receives and then selects a scheduling mode best suited for the present dynamic conditions. Selection module 575 activates either orthogonal allocation module 577 or shared allocation module 578 according to which scheduling mode is selected. Whichever allocation module 577 or 578 is selected performs the actual scheduling of resources as described herein. Implementations of OFDMA scheduler 570 have flexibility as to how many logic modules are present and how responsibilities are distributed amongst the modules.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a base station system to schedule Orthogonal Frequency Division Multiple Access (OFDMA) resource blocks for a set of Machine-to-Machine (M2M) communication devices:
in an OFDMA base station, exchanging wireless communications from wireless User Equipment;
in the OFDMA base station, receiving wireless transmission error data from the wireless User Equipment that characterizes the wireless communications transferred from the wireless User Equipment wherein the wireless transmission error data comprises at least one of a block error rate, a frame error rate, and an IP packet loss rate;
in a base station control system, selecting one of an orthogonal mode and a shared mode for M2M communications based on the wireless transmission error data;
if the orthogonal mode is selected, scheduling a plurality of contiguous OFDMA resource blocks for the set of M2M devices, wherein the contiguous OFDMA resource blocks use multiple contiguous OFDMA frequencies and use multiple contiguous OFDMA time slots that are not shared with the wireless User Equipment;
if the shared mode is selected, scheduling a plurality of non-contiguous OFDMA resource blocks for the set of M2M devices, wherein the non-contiguous OFDMA resource blocks use multiple non-contiguous OFDMA frequencies and use multiple non-contiguous OFDMA time slots that are shared with the wireless User Equipment; and
in the OFDMA base station, receiving M2M communications transferred by the set of M2M devices based on the selected schedule.

2. The method of claim 1 wherein the wireless transmission error data further comprises a forward error correction rate.

3. The method of claim 1 wherein the wireless transmission error data further comprises a HARQ retry rate.

4. The method of claim 1 wherein the wireless transmission error data further comprises a random access preamble retry count.

5. The method of claim 1 wherein the wireless transmission error data further comprises a mean opinion score.

6. The method of claim 1 wherein receiving wireless transmission error data comprises receiving from a UE a periodic CQI report over the PUCCH or an aperiodic CQI report over the PUSCH.

7. The method of claim 1 wherein the multiple contiguous OFDMA frequencies are contiguous with a guard frequency of the channel bandwidth.

8. The method of claim 1 wherein the multiple contiguous OFDMA frequencies are contiguous with the DC subcarrier frequency within the channel bandwidth.

9. The method of claim 1 wherein the multiple contiguous OFDMA frequencies includes the most faded frequency within the channel bandwidth.

10. A base station system to schedule Orthogonal Frequency Division Multiplexing (OFDMA) resource blocks for a set of Machine-to-Machine (M2M) communication devices:
an OFDMA communication interface configured to exchange wireless communications with wireless User Equipment and receive wireless transmission error data from the wireless User Equipment that characterizes the wireless communications transferred from the wireless User Equipment for receipt by the OFDMA base station wherein the wireless transmission error data comprises at least one of a block error rate, a frame error rate, and an IP packet loss rate;
a base station control system configured to select one of an orthogonal mode and a shared mode for M2M communications based on the wireless transmission error data, and if the orthogonal mode is selected, to schedule a plurality of contiguous OFDMA resource blocks for the set of M2M devices, wherein the contiguous OFDMA resource blocks use multiple contiguous OFDMA frequencies and use multiple contiguous OFDMA time slots that are not shared with the wireless User Equipment, and if the shared mode is selected, to schedule a plurality of non-contiguous OFDMA resource blocks for the set of M2M devices, wherein the non-contiguous OFDMA resource blocks use multiple non-contiguous OFDMA frequencies and use multiple non-contiguous OFDMA time slots that are shared with the wireless User Equipment; and
the OFDMA communication interface configured to receive M2M communications transferred by the set of M2M devices based on the selected schedule.

11. The base station system of claim 10 wherein the wireless transmission error data further comprises a forward error correction rate.

12. The base station system of claim 10 wherein the wireless transmission error data further comprises a HARQ retry rate.

13. The base station system of claim 10 wherein the wireless transmission error data further comprises a random access preamble retry count.

14. The base station system of claim 10 wherein the wireless transmission error data further comprises a mean opinion score.

15. The base station system of claim 10 wherein the OFDMA communication interface configured to receive a UE a periodic CQI report over the PUCCH or an a periodic CQI report over the PUSCH.

16. The base station system of claim 10 wherein the multiple contiguous OFDMA frequencies are contiguous with a guard frequency of the channel bandwidth.

17. The base station system of claim 10 wherein the multiple contiguous OFDMA frequencies are contiguous with the DC subcarrier frequency within the channel bandwidth.

18. The base station system of claim 10 wherein the multiple contiguous OFDMA frequencies includes the most faded frequency within the channel bandwidth.

\* \* \* \* \*